3,314,292
PROPELLANT TANK AND MEASURING SYSTEM
Louis O. Schulte, Covina, and Horst F. Wolf, Costa Mesa, Calif., assignors, by mesne assignments, to Douglas Aircraft Company, Inc., Santa Monica, Calif.
Filed July 29, 1963, Ser. No. 298,214
20 Claims. (Cl. 73—290)

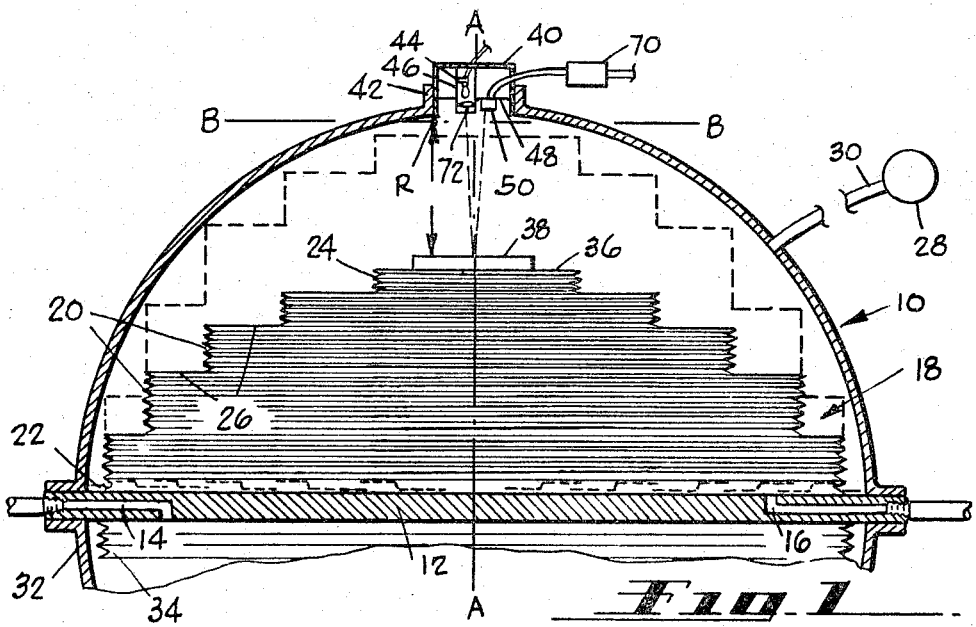
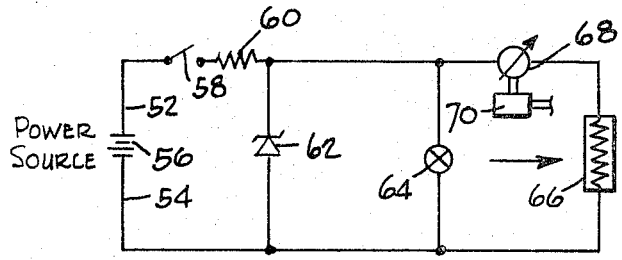
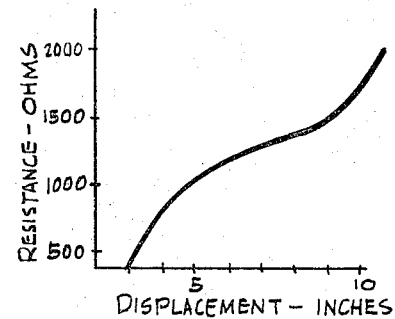
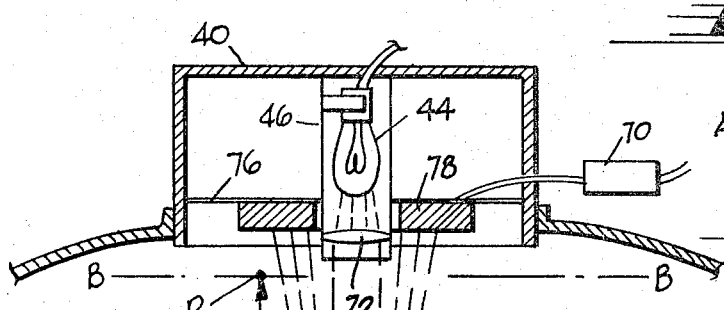
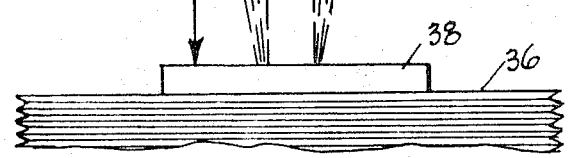
INVENTORS
LOUIS O. SCHULTE
HORST F. WOLF
By Edwin Coates
ATTORNEY United States Patent Office 3,314,292
Patented Apr. 18, 1967

This invention relates to the measurement of the quantity of propellant in the tanks of space craft and is particularly directed to a measuring system which incorporates extremely high accuracy with simplicity and unusual reliability.

Space vehicles, whether manned or unmanned, are among the most exacting mechanisms used by man at the present time. Many machines used on land or in the atmosphere require a high order of accuracy and reliability but malfunction is far less critical than in space because machines can be readily stopped and repaired and vehicles have many different safety factors to guard against serious mishap. In a space vehicle everything must function as planned at all times and information must be accurate and always available regarding all variable factors.

One of the variables which is a matter of great concern is the quantity of propellant available for various purposes. The main propulsion materials for initiating an orbiting flight are, of course, exhausted in a few minutes but the orbiting vehicle or capsule itself carries propellants for sustainer and retrothrust needs and also for execution of trajectory corrections and attitude control commands for specific missions.

The thrust systems for these functions often use bipropellant liquids. In zero-gravity or near-zero-gravity conditions the liquid fuels and oxidizers present a supply problem because they "float" in their tanks. They can be fed properly only by pressurizing the tanks with inert gas, and then means must be provided for separating the gas from the liquid so that only the liquid will pass through the supply lines to the rocket motors. Various schemes have been proposed to handle this problem but one which has turned out to be eminently satisfactory is the metallic positive expulsion bellows system disclosed in an application of W. D. Christian and G. D. Nesheim, Ser. No. 257,272, filed Feb. 8, 1963, now Patent No. 3,234,728.

Briefly, that system includes a propellant tank having bellows type side walls, the tank being of all-metal construction expandable to a generally hemispherical dome shape and collapsible against a bottom wall to substantially a diaphragm form. The tank is surrounded by a dome like pressure housing containing inert gas under pressure which continually acts against the exterior of the tank to urge it toward collapsed condition and expel its contents. Hence the liquid is always under pressure ready to flow to the motors and is completely separated from the inert gas. In a bipropellant system the housing is generally spherical with a diametral cross-member and with one collapsible tank in each half. These tanks are secured to the cross-member and the housing in pressure-tight relation, and because of their dome-like configuration they maintain a very rigid shape and position for every increment of propellant quantity contained therein at a given time.

A major problem encountered in the storage and use of pressurized liquid propellants employing liquid-gas separators has been the determination of the amount of propellant remaining in the container at any time after a portion of the contents has been expelled and utilized. This is particularly true when it is desired to avoid the use of any mechanically moving parts and in a way that permits ready conversion of the measurement into a telemetry signal. The previously used type of container employing a rigid pressurized housing surrounding a collapsible bag defied any simple solution because the bag collapsed in a non-uniform fashion providing no basis for calibration. Mechanical flowmeters could be used but they were inaccurate and unreliable and their readings required more complicated conversion apparatus.

The metallic bellows system described above lends itself well to the measuring system described hereinafter. As previously mentioned, the bellows has a very definite and fixed shape or position for every increment of volume. The free end wall, or apex of the dome, moves axially from expanded condition very close to the apex of the housing to collapsed condition very close to the cross-member. The axial positions of the end wall can be calibrated with volume changes to an accuracy of a small fraction of one percent. It remains then to provide a means of determining these positions without mechanically moving parts. The solution takes advantage of the inverse square law for the propagation of light energy and the result is an inexpensive, accurate, lightweight, and practical device.

The measuring system includes a light source in the form of a small low-voltage bulb mounted on a support substantially at the apex of the dome of the pressure housing. A light sensitive receiver is mounted in substantially side by side relation with the light source. The latter casts a beam of light rays substantially parallel to the axis of the tank and directly toward the end wall of the tank, and these rays are reflected substantially parallel to the axis back toward the receiver. Some of the rays are scattered because of the lack of perfection of the components by optical standards, but an adequate proportion of the reflected rays strike the light sensitive receiver, which may be a photocell of any known type such as a photoconductive cell, the resistance of which varies inversely with the amount or energy of the light intercepted. The attenuation of this energy, of course, varies with the square of the distance from the light source to the reflecting surface of the tank wall and back to the receiver. The output measurement is obtained in the form of a D.-C. voltage or current which can be used for direct frequency-modulation of a subcarrier or transformed into digital format and transmitted to a ground station, or otherwise utilized.

The tanks and housings in which the system is used vary from one to five feet in diameter and will be even larger in the future. It is therefore important that the incident and reflected light rays follow paths as near as possible to parallel to the axis of movement of the tank end wall so that the total variation in axial distance will produce a minimum variation in angular or lateral distance at the gage end. In a refinement of the invention a polished reflector is provided on the end wall of the tank and is made slightly concave and so arranged as to reflect the rays more directly toward the receiver at all positions of the end wall.

Various other advantages and features of novelty will become apparent as the description proceeds in conjunction with the accompanying drawing, in which:

FIG. 1 is a schematic view partly in section of a propellant tank and housing incorporating the novel propellant measuring system;

FIG. 2 is a schematic view partly in section of a modified form of some components of the system;

FIG. 3 is a schematic view in section of a modified form of reflector;

FIG. 4 is a schematic wiring diagram of a suitable circuit for the measuring system; and FIG. 5 is a graph illustrating a typical calibration curve for distance measurement vs. volume.

One of the presently preferred forms of the invention is illustrated in FIG. 1 in which housing 10 is preferably a hollow, thin-walled, rigid shell in the form of a hemisphere or dome. The open end of the shell is closed by cross-member 12 fluid-tightly secured to the shell around the margin. The cross-member is generally imperforate but is provided with suitable passages, such as 14 and 16, for ingress and egress of propellant liquids. The propellant container itself, member 18, comprises a series of generally cylindrical bellows sections 20, successively decreasing in size from base 22 to apex 24, the sections being linked together by annular rings 26 to form a liquid-tight collapsible container.

When the container is fully expanded, as indicated in one of the dotted line positions, it closely approaches the hemispherical interior shape of the housing for maximum capacity. When it is fully collapsed, as indicated in the other dotted line position, it is practically a flat membrane lying against cross-member 12 for maximum expulsion efficiency. The base 22 may be secured in pressure tight relation to either the base of the shell or the cross-member. In either event it provides a fluid-tight separation between the shell and the cross-member, and the latter then serves as a rigid or fixed end wall, base, or bottom for the container to complete the collapsible propellant tank.

Initially the tank is filled with a propellant liquid through passage 16 or through a separate inlet port. A tank of compressed inert gas 28 (usually helium or nitrogen) communicates by way of conduit 30 with the interior of shell 10 to supply inert gas under pressure to the exterior of tank 18, the pressure continually urging it toward collapsed condition, so that the tank is ready at all times to supply undiluted propellant liquid to a rocket motor on demand. In the case of a bipropellant system a second shell 32 is secured to cross-member 12 in the same way and surrounds a second tank 34 which communicates with the rocket motor by way of passage 14. Further details of construction and operation are set forth in the application of Christian and Nesheim referred to above.

The free end wall 36 of tank 18 is generally planar and normal to the longitudinal axis A—A of the tank, which may also be considered as the axis of movement of the end wall. The end wall itself may be polished to serve as a reflector, or a separate polished reflector 38 may be secured to the end wall as shown. Located preferably in line with axis A—A is a support 40 which may be of any form but is here shown as a cup-shaped member fitting in an annular flanged opening 42 in housing 10. A light source 44 is mounted within imperforate sleeve 46 and may be a small, low-voltage bulb of conventional type. A partition 48 crosses the interior of member 40 and supports light sensitive receiver 50 on its underside, being generally imperforate except for the passage of sleeve 46.

The receiver 50 forms a part of the sensor system which is illustrated in diagrammatic form in FIG. 4. The circuit includes conductors 52 and 54 and a power source 56. An interrogation switch 58 is inserted to avoid power drain during the long periods when information is not being called for. Resistor 60 and Zener diode 62 are included to stabilize the D.-C. voltage supply and minimize error in readings. Light bulb 64 is shunted across the circuit to be in parallel with the combination of photoconductive cell 66 and current meter 68. Variations in the energy of the light rays reaching the cell from the bulb result in variations in the resistance of the cell and consequent variations in the current passing through the meter 68. The latter is connected to converter 70 which may be of any suitable design and construction of known type to put the signals from cell 66 in condition for reading, recording, or telemetry.

Returning to FIG. 1 it will be seen that sleeve 46 prevents lateral rays emitted by bulb 44 from striking the photocell of receiver 50 and generally directs the emitted rays substantially parallel to the axis A—A and toward the end wall 36. These rays are reflected by the wall, or by reflector 38 if it is used, back toward receiver 50 in a substantially axial direction. While there will be some scatter because of imperfection by optical standards, a large part of the bundle of rays will reach the receiver. Because the light source and the receiver are laterally so close the included angle is very nearly zero and the reflection point on the end wall is nearly constant even though the wall may move several feet.

As mentioned above, the invention takes advantage of the inverse square law; i.e., the energy of light rays at any distance from the source decreases in proportion to the square of that distance. The effective distance from light source to receiver is actually the distance from the light source to the end wall 36 and back to the receiver. The variation in this distance as end wall 36 takes different positions changes the attenuation of the light rays, which in turn changes the resistance of the photocell and the current in the meter. Every axial position, or station, of the end wall has a definite specific relation to the quantity of propellant remaining in the tank, and each such position produces a definite repeatable meter reading indicative of the wall position with respect to a reference point such as R on line B—B, and of tank volume. Calibration is a simple and easy matter and requires checking only very infrequently. An actual calibration curve of resistance vs. bellows displacement is reproduced in FIG. 5.

The accuracy of the system is enhanced by the fact that the liquid contents of the tank are incompressible and the gas pressure urges the tank toward collapsed condition at all times. The dome-like construction of the tank also makes it extremely rigid laterally so that it is not distorted by lateral G-forces. Consequently the tank is substantially immovable at any station for measurement purposes.

If it is desired to reduce scatter and concentrate the beam of light from source 44 a lens 72 may be mounted in sleeve 46 to exactly or very nearly collimate the light rays. A further refinement may consist in forming the reflector as a slightly concave mirror 74, as shown in FIG. 3. The curvature is selected to correct for the slight but varying included angle of the rays from the end wall to the light source and the receiver.

Even though the reflector is quite smooth there will still be some scatter of the reflected rays. To minimize the chance of any of these rays being finally reflected onto the receiver, the interior of the housing 10 and the exterior of tank 18 may be treated in any known way to make them substantially non-reflective. The inert gas used for pressurization practically eliminates oxidation or corrosion of the polished or silvered surface of the reflector.

Distances have been measured by various devices using ultrasonic and microwaves but they cannot produce the necessary accuracy at very short distances or require bulky and complicated wave generators and converters or both. The light ray system of the present invention is extremely accurate, partly because the extremely high frequency of light waves provides high resolution of distance. Also the unchanging inert gas insures uniform attenuation conditions at all times. At the same time the present system gives high reliability because of the absence of mechanically moving parts. Furthermore there is no physical contact with the bellows, which normally contains cryogenic liquids. Elimination of heat loss paths is a very desirable advantage. Since the light source operates from a low voltage battery the system is simple, compact, and inexpensive.

In a refinement of the invention, as illustrated in FIG. 2, the sleeve 46 carrying light source 44 is mounted centrally of support 40, and a partition 76 carries a receiver which may be a pair of photocells at opposite sides of the sleeve and of the light beam, but is preferably a generally torus-shaped component 78 surrounding the sleeve and provided with a plurality of photocell elements. Sleeve 46 directs the beam of light substantially axially toward the reflector 38. The slightly scattered reflected rays return substantially axially all around the incident beam. Because of the complete coverage any slight tilting of the reflector resulting from vibration or unusual side loads will have very little effect on the total quantity of rays reaching the receiver. If it is desired to collimate the light rays lens 72 may be mounted in sleeve 76.

As in the case of the FIG. 1 construction, reflector 38 may be omitted and wall 36 provided with a polished surface, or a suitably shaped concave reflector 74 may be substituted.

It will be apparent to those skilled in the art that various changes and modifications may be made in the construction and arrangement of parts as disclosed without departing from the spirit of the invention and it is intended that all such changes and modifications shall be embraced within the scope of the following claims.

We claim:

1. The combination of a propellant tank, a pressure housing therefor, and a propellant measuring system; said housing including a shell member in the general shape of a dome and a generally planar cross-member secured thereto in pressure-tight relation; said tank including a bellows type side wall and a generally planar free end wall forming an envelope having an expanded shape corresponding generally to the interior of said housing dome and being collapsible into generally planar form close to said cross-member to expel the propellant contents; the outer margin of the base of said tank being secured in pressure-tight relation between said housing and said cross-member; said housing containing gas under pressure to urge said tank toward collapsed condition; said measuring system including a support member located centrally of said dome, and a light source and a light sensitive receiver mounted side by side on said support member; said light source being arranged to direct light rays toward said end wall of said tank and substantially normal thereto; said receiver being arranged to receive rays reflected from said end wall substantially parallel to the incident rays and adapted to transmit signals proportional to the energy of said reflected rays and indicative of the distance of said end wall from a reference point.

2. The combination as claimed in claim 1; said end wall bearing a polished surface for maximum reflection of said light rays.

3. The combination as claimed in claim 1; the exterior wall of said tank and the interior wall of said housing being made substantially non-reflective to minimize the incidence of scattered rays on said receiver.

4. The combination as claimed in claim 1; and means to substantially collimate the light from said light source to concentrate the incident rays and increase the percentage of reflected rays reaching said receiver.

5. The combination as claimed in claim 1; said light source being located substantially on the depth-wise axis of said tank; and said receiver having portions laterally opposed and closely adjacent to said axis on opposite sides thereof to receive a high proportion of the reflected rays adjacent to said axis.

6. The combination of a propellant tank, a pressure housing therefor, and a propellant measuring system; said tank having a first fixed end wall, a collapsible bellows type side wall, and a second free end wall movable fore and aft on the longitudinal axis of the tank to vary its volume, the position of said free end wall along said axis with respect to a reference point indicating the quantity of propellant in said tank; said housing surrounding the side and free end wall of said tank and secured to said fixed end wall in pressure-tight relation, and containing gas under pressure to urge said tank toward collapsed condition; said measuring system including a light source and a light sensitive receiver carried by said housing substantially at the longitudinal axis of said tank; said light source being arranged to direct light rays toward said free end wall and substantially normal thereto; said receiver being arranged to receive rays reflected from said end wall substantially parallel to the incident rays and adapted to transmit signals proportional to the energy of said reflected rays and indicative of the distance of said free end wall from said reference point.

7. The combination as claimed in claim 6; said free end wall including a polished reflector for maximum reflection of said light rays.

8. The combination as claimed in claim 7; the gas in said housing being an inert gas preventing oxidation or corrosion of said reflector.

9. The combination as claimed in claim 7; said reflector being slightly concave to increase the concentration of said light rays on said receiver.

10. The combination as claimed in claim 6; the exterior wall of said tank and the interior wall of said housing being made substantially non-reflective to minimize the incidence of scattered rays on said receiver.

11. The combination as claimed in claim 6; and means to substantially collimate the light from said light source to concentrate the incident rays and increase the percentage of reflected rays reaching said receiver.

12. The combination as claimed in claim 6; said light source being located substantially on the longitudinal axis of said tank; and said receiver having portions laterally opposed and closely adjacent to said axis on opposite sides thereof to receive a high proportion of the reflected rays adjacent to said axis.

13. The combination of a propellant tank and a propellant measuring system, comprising: a tank having a fixed base portion and an end wall movable toward and away from said base portion along one axis of said tank to vary its volume, the position of said end wall along said axis with respect to a reference point indicating the quantity of propellant in said tank; and a measuring system including a light source and a light sensitive receiver fixedly mounted in juxtaposition substantially at said axis and beyond the outward extended position of said end wall; at least a portion of said end wall being substantially planar and normal to said axis; said light source being arranged to direct light rays toward said end wall substantially parallel to said axis; and said receiver being arranged to receive rays reflected from said end wall substantially parallel to said axis and adapted to transmit signals proportional to the energy of said reflected rays and indicative of the distance of said end wall from said reference point.

14. The combination as claimed in claim 13; said end wall including a polished reflector having a slightly concave surface to increase the concentration of reflected light rays on said receiver.

15. The combination as claimed in claim 13; and means to substantially collimate the light from said light source to concentrate the incident rays and increase the percentage of reflected rays reaching said receiver.

16. The combination as claimed in claim 13; said light source being located substantially on said axis; and said receiver having portions laterally opposed and closely adjacent to said axis on opposite sides thereof to receive a high proportion of the reflected rays adjacent to said axis.

17. A measuring system for determining the position of a movable wall along an axis of movement with respect to a fixed reference point, comprising: a support fixedly located with respect to said reference point; a light source fixedly mounted on said support and arranged to direct light rays toward said wall along a directionally fixed line substantially parallel to said axis; and a light sensitive receiver fixedly mounted on said support adjacent to said light source and at least partially surrounding the axial beam of light therefrom to lie on opposite sides thereof and receive light rays reflected from said wall substantially parallel to said beam of incident light and at opposite sides thereof; said receiver including means to transmit signals proportional to the energy of said reflected rays and indicative of the distance of said wall from said reference point.

18. A measuring system as claimed in claim 17; said receiver including light sensitive means in the general form of a torus to intercept reflected light rays on all sides of the beam of incident light.

19. A measuring system as claimed in claim 17; said end wall including a polished reflector having a slightly concave surface to concentrate the reflected light rays closely around the beam of incident light.

20. A measuring system as claimed in claim 17; and a collimating lens arranged to concentrate the beam of light directed from said light source toward said wall.

References Cited by the Examiner

UNITED STATES PATENTS

| | | |
|---|---|---|
| 2,505,798 | 5/1950 | Skinner. |
| 2,621,719 | 12/1952 | Eaton et al. _____ 158—50.1 |
| 2,964,640 | 12/1960 | Wippler _____ 250—218 |

FOREIGN PATENTS 876,166   5/1953   Germany.

LOUIS R. PRINCE, *Primary Examiner.*

ROBERT B. HULL, ISAAC LISANN, *Examiners.*

F. H. THOMPSON, *Assistant Examiner.*